United States Patent [19]
Volz

[11] Patent Number: 5,401,084
[45] Date of Patent: Mar. 28, 1995

[54] BRAKE SYSTEM WITH ANTI-LOCK CONTROL AND TRACTION SLIP CONTROL

[75] Inventor: Peter Volz, Darmstadt, Germany

[73] Assignee: ITT Automotive Europe GmbH, Frankfurt am Main, Germany

[21] Appl. No.: 211,619

[22] PCT Filed: Sep. 30, 1992

[86] PCT No.: PCT/EP92/02258

§ 371 Date: Jul. 14, 1994

§ 102(e) Date: Jul. 14, 1994

[87] PCT Pub. No.: WO93/07036

PCT Pub. Date: Apr. 15, 1993

[30] Foreign Application Priority Data

Oct. 9, 1991 [DE] Germany .................. 41 33 484.1

[51] Int. Cl.$^6$ .............................................. B60T 8/48
[52] U.S. Cl. .................. 303/113.2; 303/113.4; 303/116.1; 303/119.1
[58] Field of Search ............... 303/113.2, 113.4, 119.1, 303/116.1, 116.2, 110, 111; 364/426.01, 426.02, 426.03

[56] References Cited

U.S. PATENT DOCUMENTS

| | | | |
|---|---|---|---|
| 4,776,643 | 10/1988 | Leiber | 303/113.4 X |
| 4,803,840 | 2/1989 | Seibert et al. | 303/113.4 |
| 4,828,338 | 5/1989 | Ocvirk et al. | 303/119.1 |
| 5,141,295 | 8/1992 | Burgdorf et al. | 303/113.4 X |

FOREIGN PATENT DOCUMENTS

| | | |
|---|---|---|
| 0303019 | 2/1989 | European Pat. Off. . |
| 0319719 | 6/1989 | European Pat. Off. . |
| 2601636 | 1/1988 | France . |
| 2626230 | 7/1989 | France . |
| 3601914 | 7/1987 | Germany . |
| 3739915 | 6/1989 | Germany . |
| 3813174 | 11/1989 | Germany . |
| 3906530 | 9/1990 | Germany . |
| 4001421 | 7/1991 | Germany . |
| 4010410 | 10/1991 | Germany . |
| 4011329 | 10/1991 | Germany . |

*Primary Examiner*—Robert J. Oberleitner
*Assistant Examiner*—Peter M. Poon
*Attorney, Agent, or Firm*—Ratner & Prestia

[57] ABSTRACT

A hydraulic brake system with anti-lock control and traction slip control having a multiple-circuit master cylinder, inlet valves and outlet valves, a pressure fluid supply reservoir, an auxiliary-pressure supply system, an electronic control unit, and pedal-travel sensors and-/or switches. The outlet valves which connect the wheel brakes of the non-driven wheels with the pressure fluid supply reservoir are driven temporarily or pulsewise in the traction slip control mode in order to safeguard that even in the event of a so-called braking intervention during the traction slip control mode, the travel of the brake pedal can be recognized by the travel switches and travel sensors which permits detection of the transition from the traction slip control mode to the braking mode.

9 Claims, 1 Drawing Sheet

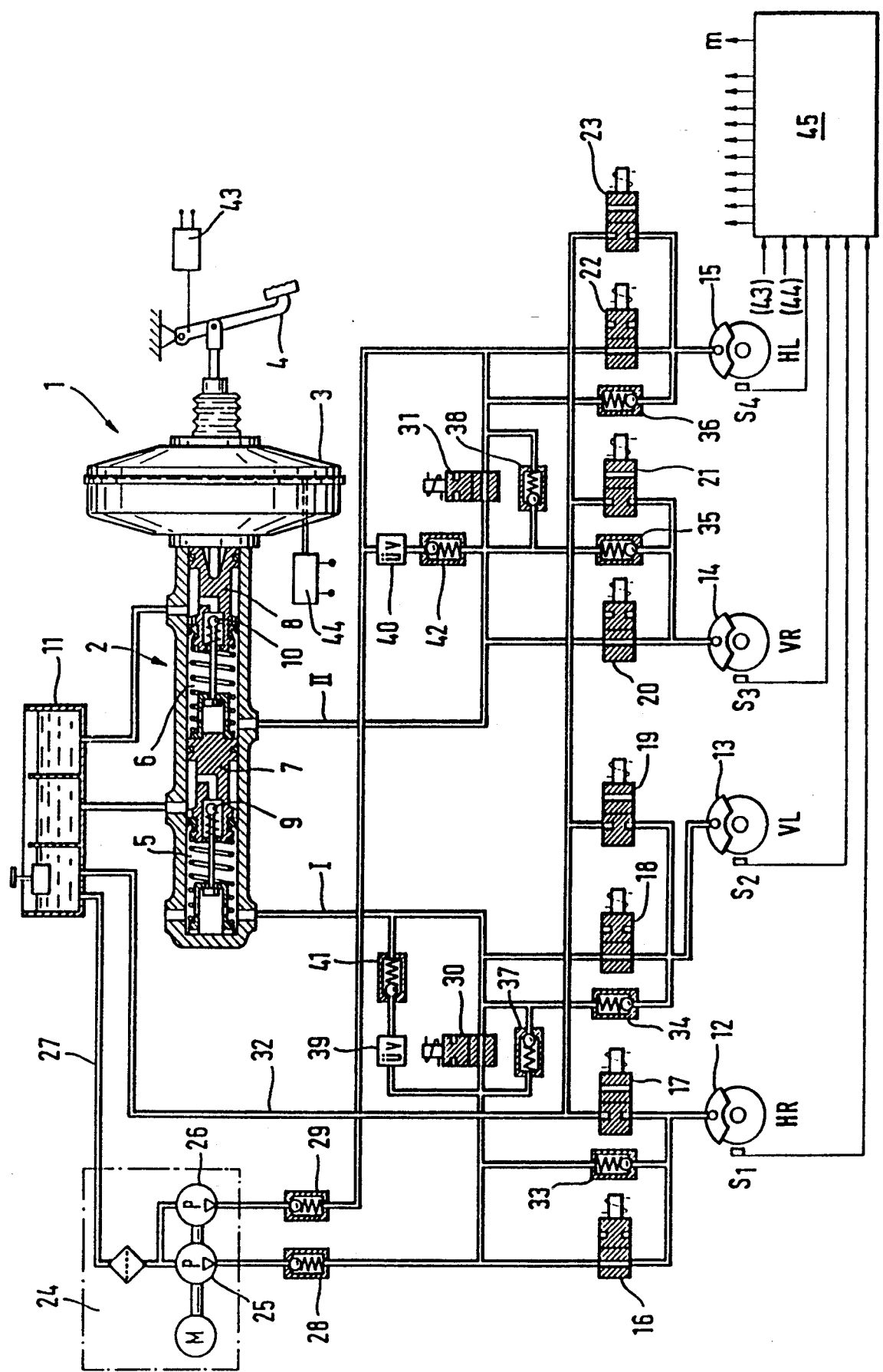

BRAKE SYSTEM WITH ANTI-LOCK CONTROL AND TRACTION SLIP CONTROL

TECHNICAL FIELD

The present invention relates to a hydraulic brake system with anti-lock control and traction slip control comprising a multiple-circuit master cylinder, electrically controllable inlet valves in the pressure-fluid conduits leading to the wheel brakes, outlet valves which connect the wheel brakes with a pressure supply reservoir in the phases of pressure reduction, an auxiliary-pressure supply system which generates braking pressure in the traction slip control phases for braking the driven wheels, while, for limiting the pressure, pressure fluid is conveyed via pressure-limiting valves into the master cylinder and flows back from there into the pressure supply reservoir via control valves, pedal-travel sensors and/or pedal-travel switches, and an electronic control unit.

BACKGROUND OF THE INVENTION

Brake systems of this type, having different designs, are known in the prior art. The publication DE-36 01 914 A1, for instance, describes a dual-circuit hydraulic brake system with anti-lock and traction slip control, wherein the wheel brake of each wheel is connected to the brake system via a pair of inlet and outlet valves. For auxiliary-pressure supply during an anti-lock control operation or a traction slip control operation, a dual-circuit hydraulic pump is provided which is in operation only during a control action. In the traction slip control mode, the pump delivers, in two separate circuits, pressure fluid via pressure-limiting valves to the working chambers of the master cylinder which, in turn, are in communication with the pressure supply reservoir of the brake system via central valves. These pressure-limiting valves are connected in parallel with electrically controllable shut-off valves which, in their inactive position, connect the auxiliary-pressure supply system with the master cylinder.

These shut-off valves, with the parallel connected pressure-limiting valves, are inserted into the hydraulic system such that, after change-over of the shut-off valves, the non-driven wheels and, respectively, the associated inlet valves continue to be connected to the master cylinder, while the driven wheels are connected to the auxiliary pressure supply system. This is because only the brakes of the driven wheels are required for traction slip control. The direct pressure fluid conduit from the master cylinder to the wheel brakes of the non-driven wheels, which is kept open likewise in the traction slip control mode, makes possible a so-called braking intervention (brake actuation) during the TSC mode through these wheel brakes.

Further, it is known, even though not mentioned explicitly in the publication referred to hereinabove, to determine the pedal actuation or the pedal travel through travel switches or travel sensors, such as stop light switches, switches fitted to the master cylinder piston etc., and to generate corresponding electric signals. These travel-responsive signals are required for controlling and monitoring controlled brake systems. The difficulty encountered in brake systems of the type described hereinabove is that the "braking intervention" during the TSC mode, in consequence of the switched-on auxiliary-pressure supply system and the constant delivery of pressure fluid into the master cylinder, causes pressure to develop very quickly in the working chambers of the master cylinder which permits no pedal movement at all or only insufficient pedal movement. A safe response of the travel-responsive switches or sensors, therefore, is not assured. A mutual monitoring of several switches in respect of their operability is not possible. In order to recognize the brake pedal actuation without any doubt, it has proven necessary to sense the braking pressure in the master cylinder chambers in addition to the pedal travel. The complexity and cost of such an arrangement is a major disadvantage.

SUMMARY OF THE INVENTION

Therefore, it is an object of the present invention to overcome the described shortcoming of known systems and to safeguard, by simple and low-cost measures, that, even in the event of braking intervention during the TSC mode, a piston travel or piston advance motion occurs which can be sensed reliably and can be assessed as a criterion for the control or monitoring.

This object can be achieved by an improvement upon the above-referenced brake system which resides in that, during a traction slip control phase, the control unit drives, at least temporarily, the outlet valves which connect the wheel brakes of the non-driven wheels with the pressure supply reservoir, and thereby releases a pressure fluid conduit from the master cylinder via the inlet valves and outlet valves of the non-driven wheels to the pressure supply reservoir.

The present invention safeguards, by an extremely simple measure which involves no additional manufacturing costs, that the brake pedal covers an assessable travel even in the event of braking intervention during a TSC mode. This is accomplished by providing a pressure fluid by-pass line to the pressure supply reservoir through the component parts which are already provided in the system.

The outlet valves providing communication between the driven wheels and the pressure supply reservoir, expediently, are driven by a sequence of short pulses. However, as throttles are available in the pressure fluid conduit anyway, constant opening of these outlet valves during the TSC mode is also possible.

It should be sufficient, in many cases, that only one of a plurality of outlet valves allocated to the non-driven wheels opens in the TSC mode.

Further features, advantages and possible applications of the present invention can be gathered from the following description of an embodiment of the present invention taken with reference to the accompanying drawing.

BRIEF DESCRIPTION OF THE DRAWING

The only figure shows in a schematic simplification the most important hydraulic component parts of a brake system according to the present invention and their connections. Some electronic or electric component parts are illustrated schematically as well.

DETAILED DESCRIPTION OF THE INVENTION

The brake system depicted in the drawing comprises a braking pressure generator 1, which is composed of a tandem master cylinder 2 and a vacuum brake power booster 3 connected upstream of the tandem master cylinder, to which brake force is applied through a pedal 4.

The two working chambers 5, 6 of the master cylinder 2 are connected to the wheel brakes 12, 13, 14 and 15 via two hydraulically isolated circuits I, II in diagonal arrangement. The left front wheel VL and the right rear wheel HR are associated with the brake circuit I, while the two other wheels VR, HL are associated with the brake circuit II. Each wheel is furnished with a pair of inlet and outlet valves 16, 17; 18, 19; 20, 21; 22, 23. The pressure-fluid conduits lead to a pressure supply reservoir 11 via the outlet valves 17, 19, 21, 23.

The brake system further includes an auxiliary-pressure supply system 24 which, for the embodiment of the present invention being described, is in the form of two hydraulic pumps 25, 26 with a joint electromotive drive M. The auxiliary-pressure supply system 24 is connected to the master cylinder 2 via non-return valves 28, 29 and shut-off valves 30, 31, with pressure-limiting valves 39, 40 and associated non-return valves 41, 42 connected in parallel with the shut-off valves. The working chambers 5, 6 are connected with the joint pressure supply reservoir 11 via control valves 9, 10 in the floating piston 7 and pushrod piston 8, respectively, of the master cylinder.

The shut-off valves 30, 31 are inserted into the two pressure-fluid circuits I, II such that after switch-over of these shut-off valves 30, 31, pressure fluid out of the auxiliary-pressure supply system 24 can only propagate to the wheel brakes 12, 15 of the driven wheels, namely the rear wheels HR, HL. The non-driven wheels, namely the front wheels VL, VR, which are connected directly to the master cylinder via their inlet valves 18, 20 consequently remain pressureless in the TSC mode.

Connected in parallel with each inlet valve 16, 18, 20, 22, in a known manner, is a non-return valve 33, 34, 35 and 36 which safeguards the braking pressure reduction after release of the brake. The non-return valves 37, 38, connected in parallel with the shut-off valves 30, 31, become effective, if necessary, in the event of braking intervention during the TSC mode.

In the illustrated embodiment of the present invention, the braking pressure generator 1 further is equipped with a brake switch or stop light switch 43 and a pedal travel sensor 44. The pedal travel sensor 44 is coupled to the piston of the vacuum booster 3. A potentiometer, for example, is suitable as a pedal travel sensor 44.

In the TSC mode, the auxiliary pressure which is generated by the hydraulic pumps 25, 26 is limited to a predetermined value by the pressure-limiting valves 39, 40. As soon as this maximum pressure is reached, pressure fluid is delivered, via the pressure-limiting valves 39, 40, to the working chambers 5, 6 and, via the control valves 9, 10, back into the pressure supply reservoir 11. The suction sides of the hydraulic pumps 25, 26 are connected to the reservoir 11 via line 27.

An electronic control unit 45 is provided to control the electrically operable valves, namely the inlet valves and outlet valves and the shut-off valves, as well as for switching on and off the electric motor M of the auxiliary-pressure supply system. The corrective signals are obtained, in a known fashion, from various measurement signals. Above all, the rotational behavior of the individual wheels is assessed which is measured with the aid of wheel sensors $S_1$, $S_2$, $S_3$ and $S_4$. To monitor the system to distinguish between ambiguous data etc., moreover, the output signals of the stop light switch 43 and the travel sensor 44 are taken into account.

The control unit 45 likewise controls, during a traction slip control operation, the actuation of the outlet valves 19, 21 in the conduits which lead from the wheel brakes 13, 14 of the non-driven wheels VL, VR to the pressure supply reservoir 11, the actuation of these valves being essential for operation of the invention. Outlet valves 19, 21 can be actuated during the entire duration of traction slip control phases or, at least temporarily, by a pulse train. The following mode of operation results:

In the TSC mode, namely during a traction slip control operation, both hydraulic pumps 25, 26 of the circuits I, II are switched on and supply pressure fluid, via the pressure-limiting valves 39, 40, into the working chambers 5, 6 of the master cylinder 2. When the brake is not actuated, the open control valves 9, 10 prevent a rise of the pressure in the chambers 5, 6. When the pedal 4 is depressed, however, the central valves 9, 10, serving as control valves, will be closed instantaneously, namely after a scarcely perceptible pedal travel, so that pressure builds up very quickly which locks the pedal 4 practically in its initial position. Neither the stop light switch 43 nor the travel sensor 44 respond. The transition from the TSC mode into a braking mode cannot be recognized by virtue of these travel-responsive switches and/or sensors. A reliable signalling of this situation would be possible only by means of a sophisticated pressure sensor.

In the TSC mode, however, a by-pass is established via the inlet valves 18, 20 and the outlet valves 19, 21 to the pressure fluid reservoir 11 according to the present invention. Consequently, pressure fluid can discharge also after the control and central valves 9, 10 are closed. This results in the desired pedal travel or pedal advance motion and finally in the response of the travel-responsive switches or sensors 43, 44. Due to the described measure according to the present invention, which can be realized without any additional manufacturing effort, the transition from the TSC mode into the braking mode is recognized. The detection of every error in time, due to the mutual monitoring of the two travel-responsive switches 43, 44, is ensured. Because this operation is performed in a known fashion, a further detailed description of this operation need not be provided.

Although in the foregoing description of the operation of this braking system both of the outlet valves associated with the non-driven wheels is controlled during the TSC mode, it may be sufficient, in many cases, that only one of these outlet valves is controlled during the TSC mode.

I claim:

1. A hydraulic brake system with anti-lock control and traction slip control for a vehicle having one driven and one non-driven axle comprising a multiple-circuit master cylinder, comprising electrically controllable inlet valves in the pressure-fluid conduits leading to the wheel brakes, and comprising outlet valves which connect the wheel brakes with a pressure supply reservoir in the phases of pressure reduction, comprising an auxiliary-pressure supply system which generates braking pressure in the traction slip control phases for braking the driven wheels, while, for limiting the pressure, pressure fluid is conveyed via pressure-limiting valves into the master cylinder and flows back from there into the pressure supply reservoir via control valves, and comprising an electronic control unit, characterized in that, the brake system is equipped with at least one of pedal-travel sensors and pedal-travel switches, and in that, during a traction slip control phase, the control unit drives at least temporarily the outlet valves which connect the wheel brakes of the non-driven wheels with the pressure supply reservoir, and thereby releases a pressure fluid conduit from the master cylinder via the inlet valves and outlet valves of the non-driven wheels to the pressure supply reservoir.

2. A brake system as claimed in claim 1, characterized in that the outlet valves of the non-driven wheels are driven by applying a pulse train.

3. A brake system as claimed in claim 1, characterized in that the outlet valves of the non-driven wheels re driven during the entire duration of the traction slip control phases.

4. A brake system as claimed in claim 1, characterized in that an outlet valve which connects but one of the non-driven wheels with the pressure supply reservoir is driven during the traction slip control phase.

5. A hydraulic brake system for a vehicle having driven and non-driven wheels and anti-lock control and traction slip control, said brake system comprising:
   first sensing means for sensing rotational behavior of the wheels of the vehicle;
   a brake pedal;
   wheel brakes associated with the driven wheels of the vehicle;
   wheel brakes associated with the non-driven wheels of the vehicle;
   a pressure fluid supply reservoir;
   a master cylinder, responsive to said brake pedal, having control valves and working chambers in fluid communication with said pressure fluid supply reservoir through said control valves;
   first pressure-fluid conduits leading from said master cylinder to said wheel brakes;
   electrically controllable inlet valves in said first pressure-fluid conduits for selectively connecting said master cylinder to said wheel brakes;
   second pressure-fluid conduits leading from said wheel brakes to said pressure fluid supply reservoir;
   electrically controllable outlet valves in said second pressure-fluid conduits for selectively connecting said wheel brakes to said pressure fluid supply reservoir;
   an auxiliary-pressure supply system, including:
      (a) a source of auxiliary pressure,
      (b) third pressure-fluid conduits leading from said source of auxiliary pressure to said master cylinder, and
      (c) pressure-limiting valves in said third pressure fluid conduits,
   for generating braking pressure in traction slip control phases and applying pressure fluid to said wheel brakes associated with the driven wheels, while limiting, by means of said pressure-limiting valves, pressure fluid applied to said master cylinder for flow of pressure fluid through said control valves of said master cylinder to said pressure fluid supply reservoir;
   second sensing means for sensing movement of said brake pedal;
   and an electronic control unit, responsive to said first sensing means and said second sensing means, for controlling, at least temporarily during a traction slip control phase, at least one of said outlet valves in said second pressure-fluid conduits leading to a wheel brake associated with one of the non-driven wheels to connect said wheel brake with said pressure fluid supply reservoir to release pressure fluid from said first pressure-fluid conduit leading to said wheel brake to said pressure fluid supply reservoir through said inlet valve in said first pressure-fluid conduit leading to said wheel brake associated with the non-driven wheel and said outlet valve in said second pressure-fluid conduit leading from said wheel brake associated with the non-driven wheel.

6. A brake system according to claim 5 wherein said outlet valves which connect said wheel brakes associated with the non-driven wheels with said pressure fluid supply reservoir are controlled by a pulse train.

7. A brake system according to claim 5 wherein said outlet valves of the non-driven wheels are driven during the entire duration of the traction slip control phases.

8. A brake system according to claim 5 wherein only one of said outlet valves is controlled during the traction slip control phase.

9. A brake system according to claim 5 wherein all of said outlet valves are controlled during the traction slip control phase.

* * * * *